United States Patent
Kinjo et al.

(10) Patent No.: US 7,372,837 B2
(45) Date of Patent: May 13, 2008

(54) INCREMENTAL REDUNDANCY USING TWO STAGE RATE MATCHING FOR AUTOMATIC REPEAT REQUEST TO OBTAIN HIGH SPEED TRANSMISSION

(75) Inventors: Shigenori Kinjo, Okinawa (JP); Hisashi Onozawa, Ibaraki (JP)

(73) Assignee: Texas Instrument Incorporated, Dallas, TX (US)

( * ) Notice: Subject to any disclaimer, the term of this patent is extended or adjusted under 35 U.S.C. 154(b) by 1192 days.

(21) Appl. No.: 10/269,441

(22) Filed: Oct. 11, 2002

(65) Prior Publication Data

US 2003/0133497 A1   Jul. 17, 2003

Related U.S. Application Data

(60) Provisional application No. 60/346,754, filed on Oct. 26, 2001, provisional application No. 60/350,277, filed on Nov. 2, 2001.

(51) Int. Cl.
*H04Q 7/28* (2006.01)
*H04Q 7/20* (2006.01)
*H04B 7/216* (2006.01)

(52) U.S. Cl. ............... 370/338; 370/335; 370/341; 455/450

(58) Field of Classification Search ......... 370/477, 370/468, 278, 230, 252, 338, 335, 341; 375/152; 714/790, 789
See application file for complete search history.

(56) References Cited

U.S. PATENT DOCUMENTS

| | | | |
|---|---|---|---|
| 6,697,986 B2* | 2/2004 | Kim et al. | 714/751 |
| 7,000,173 B2* | 2/2006 | Buckley et al. | 714/790 |
| 7,013,143 B2* | 3/2006 | Love et al. | 455/450 |
| 7,197,021 B2* | 3/2007 | Seo et al. | 370/335 |
| 7,260,770 B2* | 8/2007 | Stewart et al. | 714/790 |
| 7,272,191 B2* | 9/2007 | Taffin et al. | 375/261 |
| 2003/0079170 A1* | 4/2003 | Stewart et al. | 714/755 |

* cited by examiner

*Primary Examiner*—Tilahun Gesesse
(74) *Attorney, Agent, or Firm*—Ronald O. Neerings; Wade James Brady, III; Frederick J. Telecky, Jr.

(57) ABSTRACT

Methods and apparatus for processing a data stream for high speed wireless Transmission. At the transmission side, the methods and apparatus rate-match an encoded stream of combined information bits and corresponding cyclic redundancy bits in two stages. The first rate matching stage punctures (throws away) or repeats bits such that the number of bits in the data stream is equal to the size of a mobile unit buffer. The second rate matching stage further punctures or alternately repeats bits in the data stream so that the total number of bits in the resulting data stream is equal to the frame size of the transport channel. The bits punctured or repeated by the second rate matching varies according to different versions of parameters for any retransmissions. At the receiver side, the two-stage rate matching is reversed to restore the original encoded data stream. The encoded data stream is then decoded and repeated, if necessary.

17 Claims, 6 Drawing Sheets

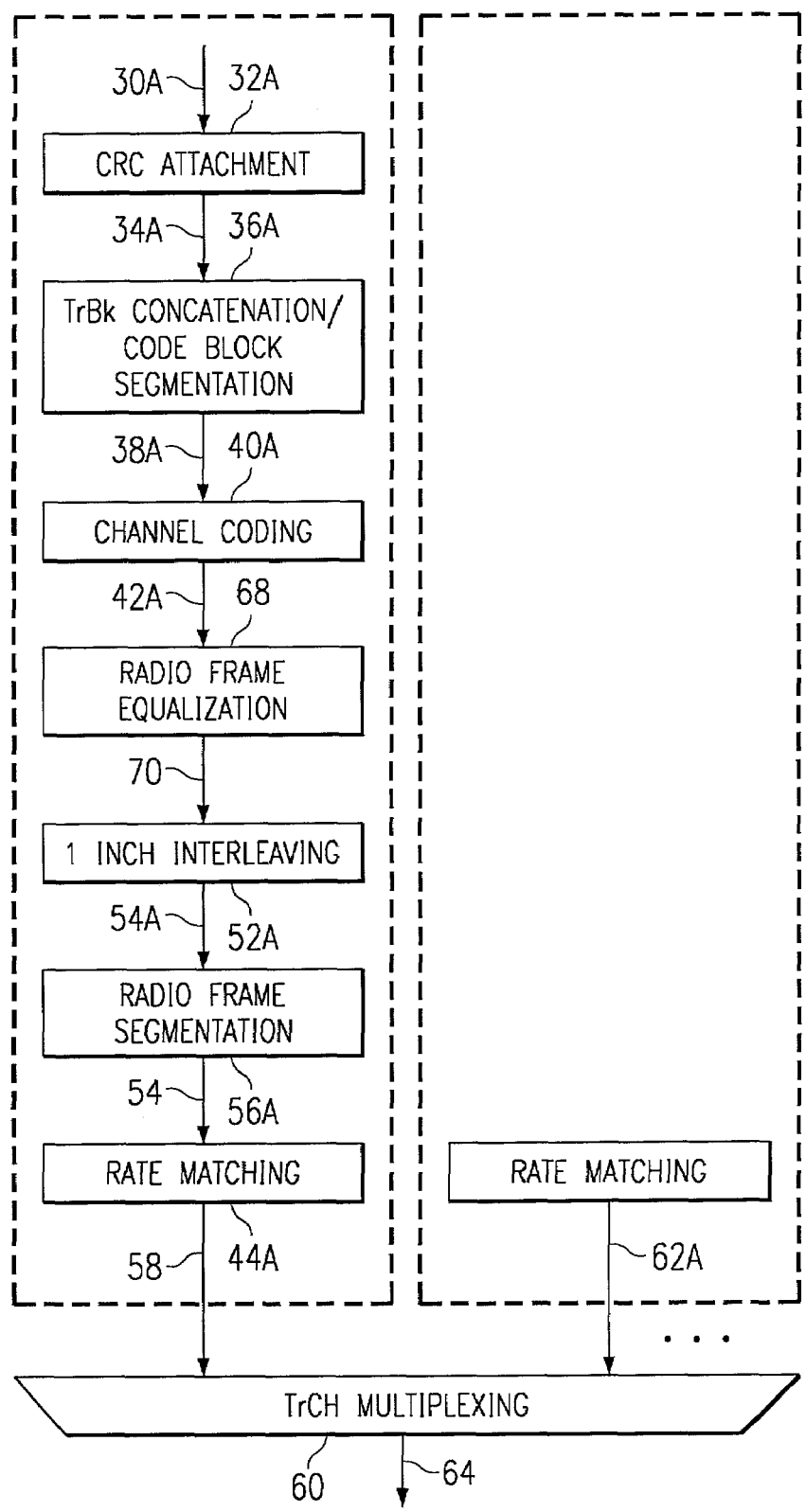

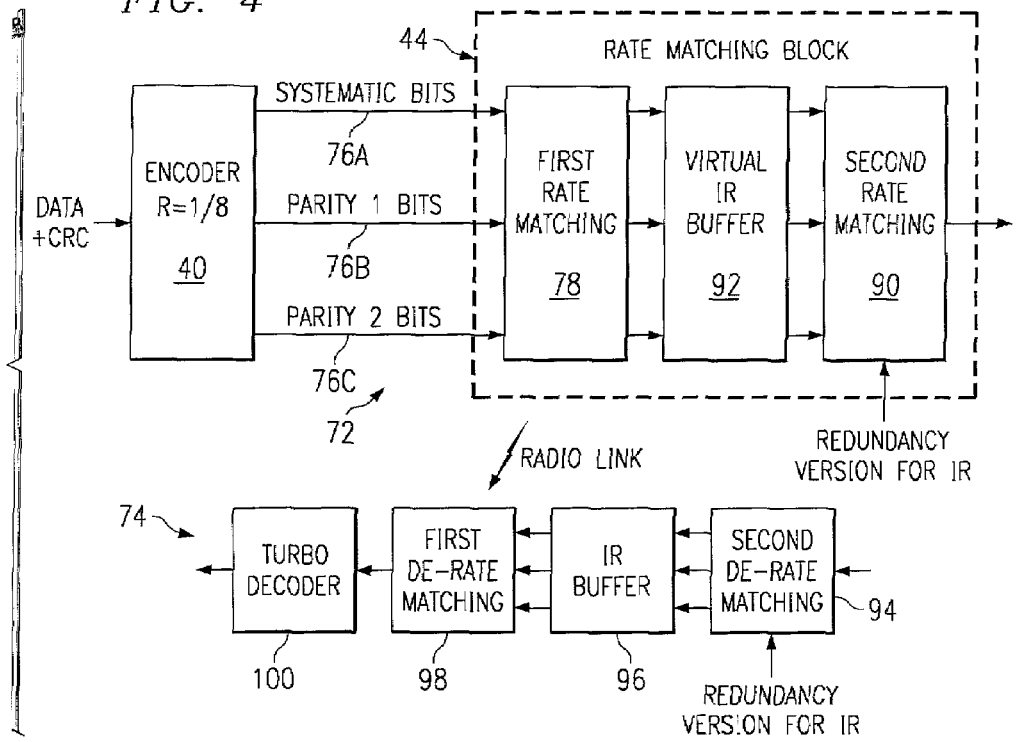
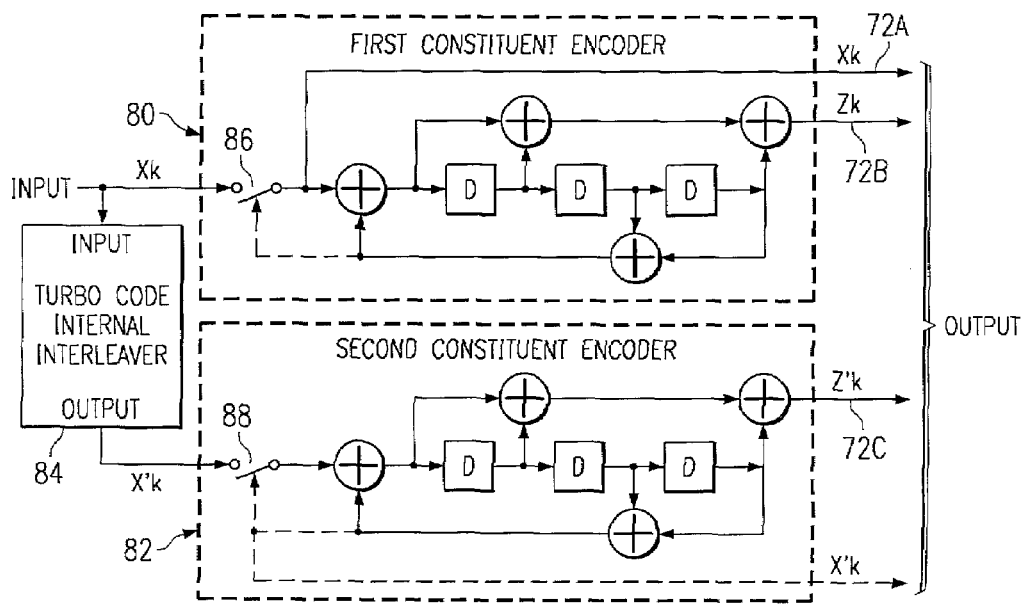

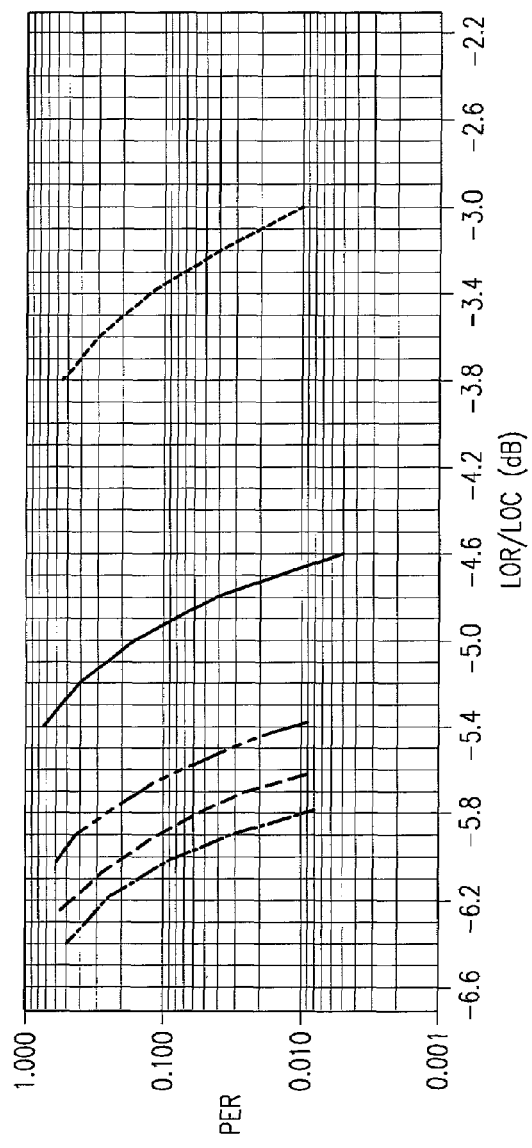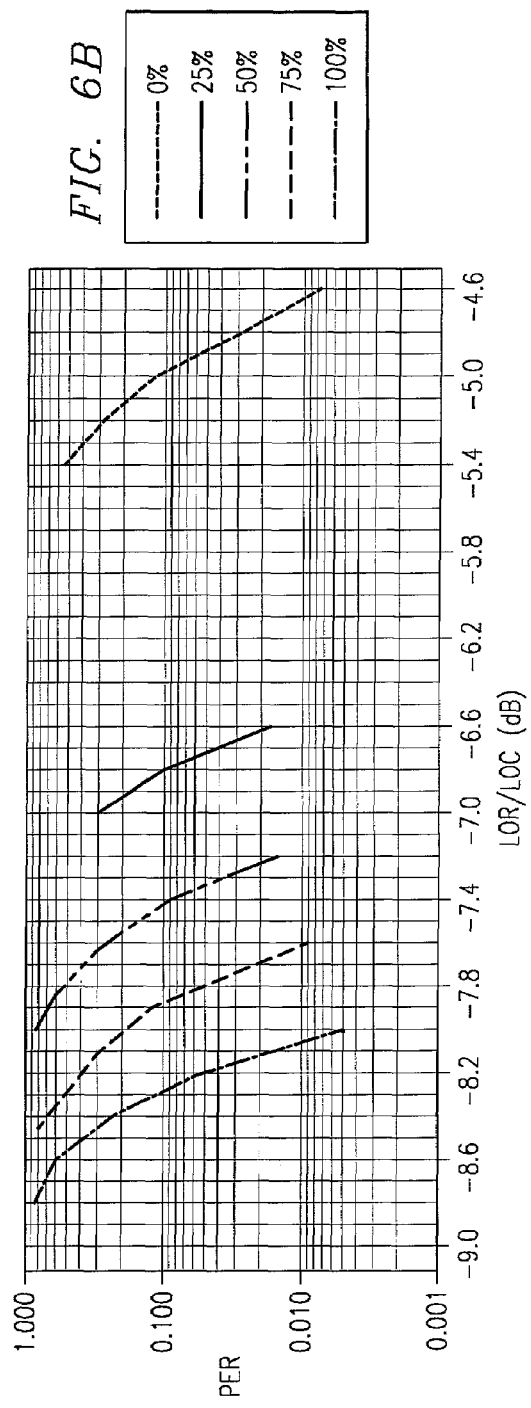

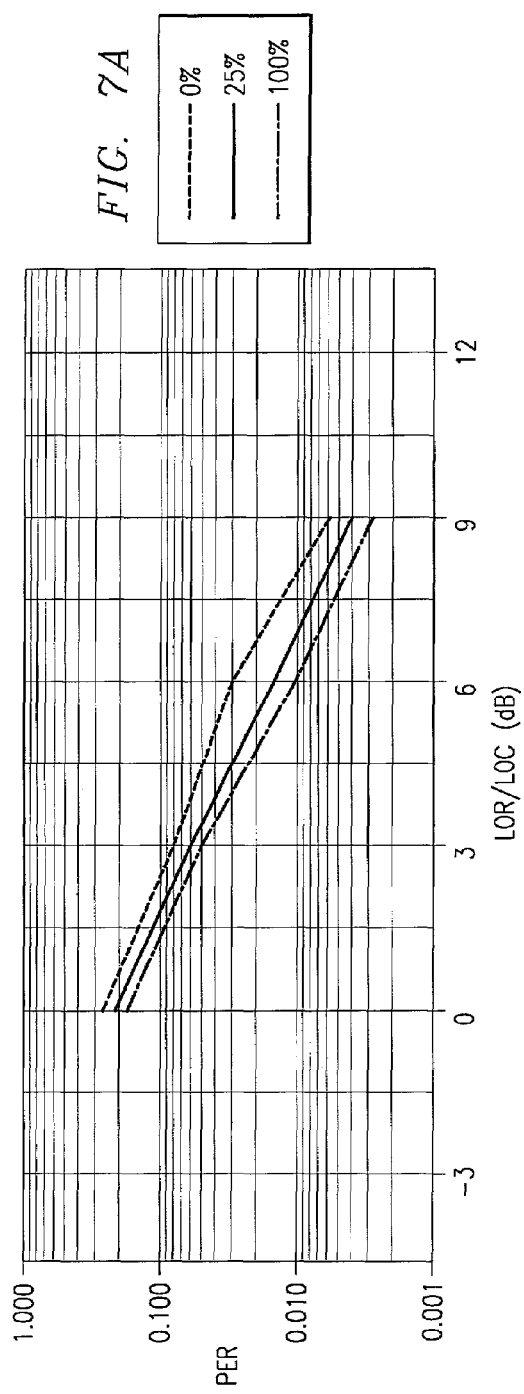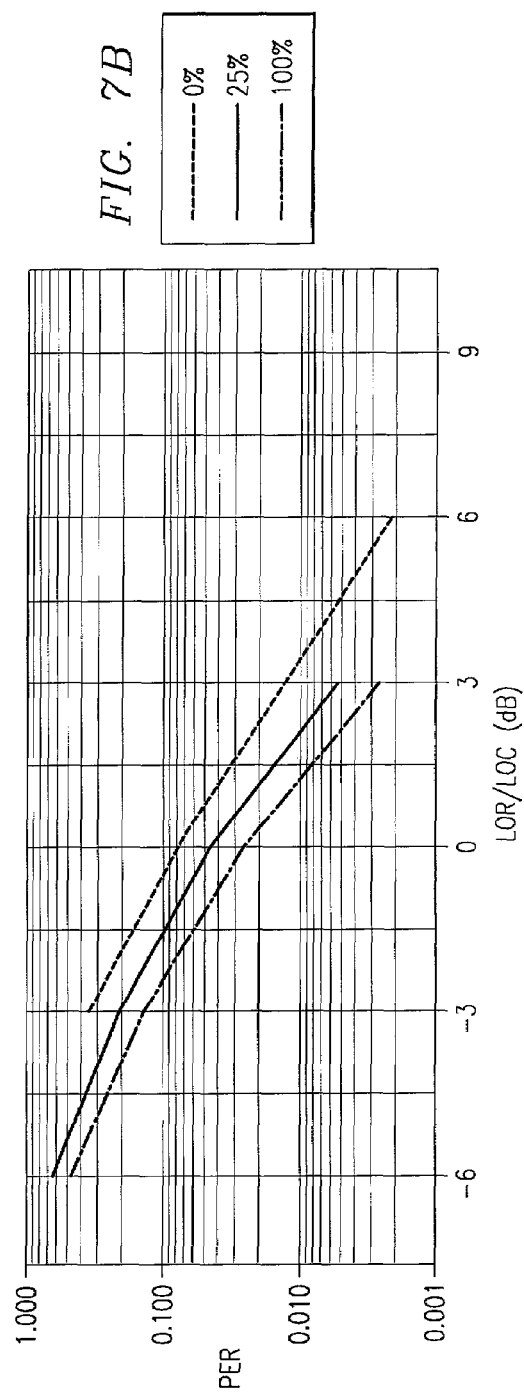

INCREMENTAL REDUNDANCY USING TWO STAGE RATE MATCHING FOR AUTOMATIC REPEAT REQUEST TO OBTAIN HIGH SPEED TRANSMISSION

This application claims the benefit of U.S. Provisional Application No. 60/346,754, filed on Oct. 26, 2001 and U.S. Provisional Application No. 60/350,277, filed Nov. 2, 2001, both entitled "Two Stage Rate Matching for 3GPP HSDPA" which applications are hereby incorporated herein by reference.

FIELD OF THE INVENTION

The present invention relates to Automatic Repeat Requests (ARQ) to obtain high speed data packet access (HSDPA) or transmission. This process may be referred to hereinafter as HARQ. More specifically the invention relates to methods and apparatus using two stage rate matching and changing the second stage of the rate matching to generate different incremental redundancy (IR) versions for subsequent retransmission attempts when a CRC (cyclic redundancy check) fails.

BACKGROUND OF THE INVENTION

As will be appreciated by those skilled in the art, the wireless unit or mobile telephone is no longer simply used for voice communications. Although voice communications remain a primary purpose for many of these communication devices, these devices are being called on to provide the same communication data exchange services demanded by the hard wired communication systems including the transmission of vast amounts of data such as provided through public and private internet connections. The mobility of the wireless units, the high data transmission rates required, and the variations in transmission channel quality used with these systems presents challenges to the accurate high speed transmission of large blocks of data. As will be appreciated by those skilled in the art, during normal telephone or voice communication, the loss of a few data bits may result in nothing more than static on the line, but the intended information is still normally conveyed from one party of the conversation to the other party.

Further, if the static or break-up is so bad that information is not conveyed, the receiving party may simply ask the other party to repeat what was said. The high speed transmission of large blocks of data is not so forgiving, since the loss of a single bit in a transmission stream may render the data completely useless.

To meet the new demands placed on wireless systems, recent developments have evolved from the original analog cellular or mobile telephones which were originally almost entirely limited to voice communications. Second-generation digital mobile cellular phones were also primarily concerned with voice communications, but instead of using conventional analog transmissions, transmitted voice data in digital packets. Transmission of digital packets, however, readily lends itself to the transmission or exchange of vast amounts of non-voice data as well as voice data. In any event, the demands for transmitting various types of digital data has recently exploded, and the processing or packaging of non-voice digital data for transmission over wireless communication systems has developed rapidly and separately from the processing and packaging of voice data packets.

The rapidly increasing demand for transmitting high volume non-voice data has introduced new problems. For example, a CDMA 3G (third generation) system has the capability of transmitting large blocks of non-voice data at significantly higher bit rates. The present invention discloses novel methods and apparatus for efficiently achieving the accuracy necessary for meaningful high speed transmission of large quantities of data.

SUMMARY OF THE INVENTION

Other objects and advantages of the invention will in part be obvious, and will in part appear hereinafter, and will be accomplished by the present invention which provides methods and apparatus for processing a data stream for high speed wireless transmission between a transmitting unit and a receiving unit. According to the present invention a data stream comprised of information bits and "cyclic redundancy" bits, hereinafter often referred to as "systematic" bits, is provided to an encoding circuitry such as a Turbo Encoder. The encoder manipulates the provided data stream and generates first, second and third bit streams comprised of the systematic bits, a set of first parity bits and a set of second parity bits. The base station evaluates the wireless receiver and determines the size of the buffer or bit storage locations. The base station then sets the value of a "virtual buffer" equal to the buffer on the wireless unit. A first rate matching circuit punctures (throws away) or repeats selected bits of the first, second and third bit streams as necessary, so that the total number of bits in the bit stream is equal to the size set for the "virtual buffer". The base station control circuitry also determines the number of bits that can be transmitted by a selected transport channel during a transmission frame. The first rate matched data streams are then sent to a second stage or second rate matching circuitry. The second stage of rate matching may further puncture or repeat bit of the data stream so that the size of the data stream is the same size as the number of bits that can be transmitted by the transport channel. The specific data bits punctured or repeated by the second stage are determined by a selected set of parameters referred to as a redundancy version RV. The redundancy version changes each time a request for retransmission of the data packet is made.

At the receiving or wireless unit, the transport stream of data bits is then processed by a de-rate matching circuitry to reverse the action of the second rate matching circuitry in an effort to reconstruct the data bits exactly as they were transmitted. The reconstructed data bits, whether reconstructed the same or different from the original, are stored in the circuit's wireless buffer. The reconstructed data stream is also provided to another de-rate matching circuitry which reverses the process of the first rate matching process in an attempt to arrive at the original encoded data stream. Of course, if some of the transmitted data bits were corrupted, the data stream will not be the same. In any event, the "recovered" encoded data stream is then decoded and subjected to a CRC (cyclic redundancy check). If the original data stream was reconstructed correctly, the CRC passes and an ACK (acknowledgement) signal is transmitted back to the base station. If the data stream cannot be properly decoded so as to pass the CRC, a NACK "not acknowledged" signal is transmitted to the base station, which results in the base station retransmitting the data package. However, before retransmitting, the selected set of parameters or RV which controls the second rate matching circuitry is changed and then the packet is retransmitted. The new data is processed by the de-rate matching circuitry and common bits are soft combined or "Chase Combined" at the buffer and different bits are stored in additional locations. The de-rate matching process and decoding is again used to process the reconstructed data stream using the results of the soft combining. The resulting data stream is then again subjected to a CRC to determine if the check passes or fails. The process is repeated until the CRC or cyclic redundancy check passes.

BRIEF DESCRIPTION OF THE DRAWINGS

FIG. 3 illustrates uplink data flow processing prior to transmitting from a wireless unit to a base station;

FIG. 4 is a block diagram of circuitry of the present invention;

FIG. 5 is a block diagram of one embodiment of the present invention using Turbo coding as an example of suitable coding for use with the invention; and FIGS. 6 and 7 are graphs illustrating the PER (Packet Error Rates) for different transmission techniques.

DESCRIPTION OF PREFERRED EMBODIMENTS

Figure 1:
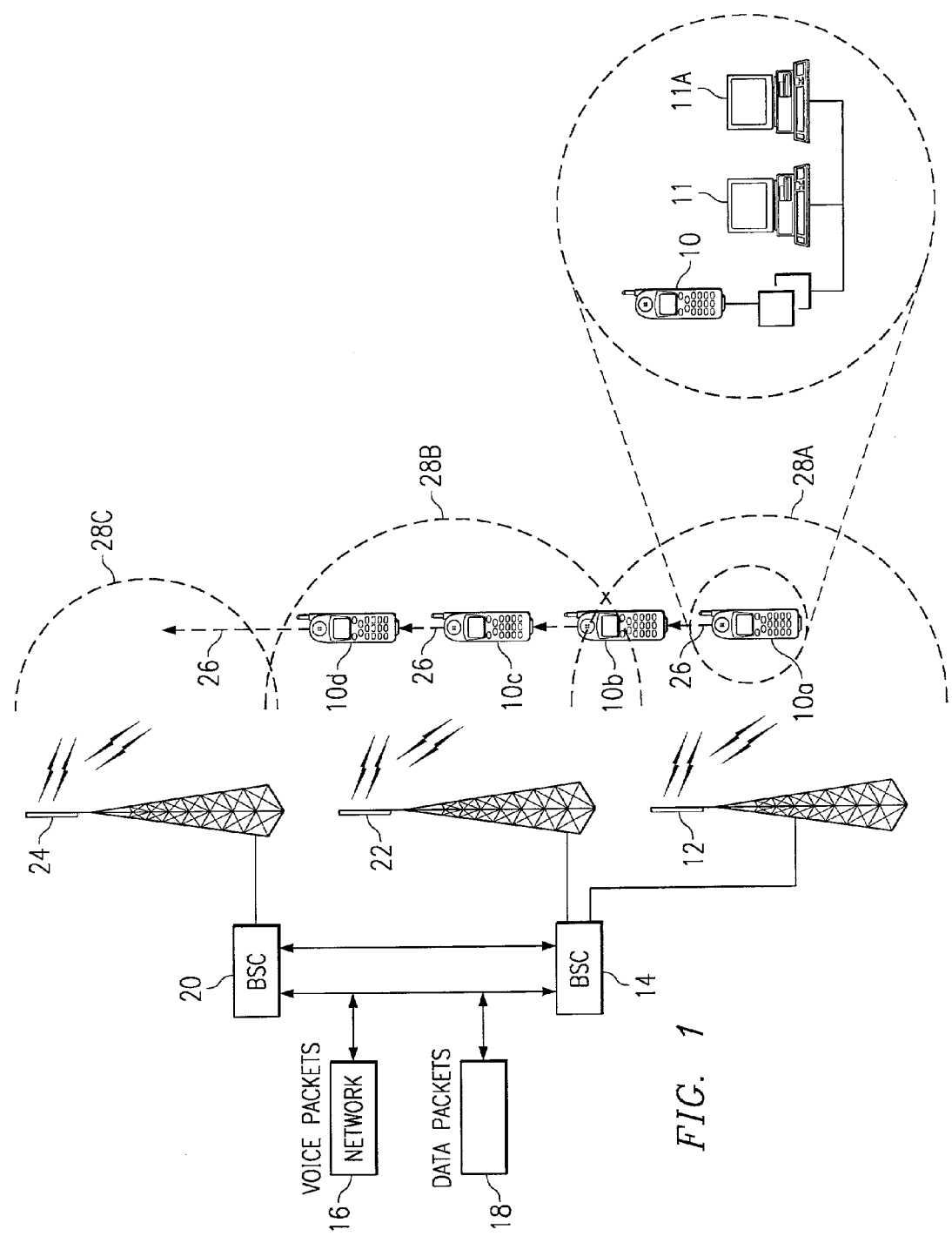
FIG. 1 illustrates a schematic view of a typical 3G system suitable for accurate high speed transmission of large quantities of data.

Referring now to FIG. 1, there is shown a basic block diagram and schematic view of a wireless system suitable for use with the present invention. Although details of the invention will be discussed hereinafter, a very generalized discussion of a typical wireless communication system follows with respect to FIG. 1. As shown, a wireless terminal 10 is in communication with a transmission tower or BTS (Base-station Transceiver Subsystems) 12 in a particular region or area. As used herein, the term "wireless terminal" is applicable to wireless/mobile telephones, terminals in the form of combinations of wireless Personal Digital Assistants (PDAs or "Palm Pilots") and mobile telephones, wireless networking cards connected to stationary or mobile equipment, and the like. For example, as shown in the expanded view, wireless terminal 10 may be connected to computer terminal. Alternatively, the wireless terminal 10 may be connected to a data terminal 11A.

The BTS 12 such as a transmission tower is itself in communication with a controller such as a BSC (Base Station Controller) 14 which receives and typically combines both voice packets from a circuit switch network 16 and data packets provided from a network 18. Network 18 is typically in communication with various sources of data such as the public internet or private data sources. It is noted that the network 18 may also be in communication with other networks for providing data packets (not shown), and of course, circuit switch network 16 will be in communication with other voice-based networks (not shown).

Further, although FIG. 1 only indicates that network 18 is in contact with BSC unit 14 and a second BSC unit 20, it will be appreciated that network 18 and the voice-based circuit switch network 16 may actually be in contact with a large number of BSC units.

Also as shown, FIG. 1 includes second and third base transmission stations (BTS) units such as towers 22 and 24 for purposes of illustrating how wireless terminal 10 may be in the form of a mobile terminal such as a mobile telephone or unit 10 capable of movement along a selected path. For example, as shown in FIG. 1, unit 10 is moving along path 26 from the first location (indicated at 10a) where it is in radio communication only with BTS unit 12 to a second location as indicated at 10b where it is in communication with both BTS unit 12 and second BTS unit 22 at a different location, which will allow a handoff or handover which will be transparent to the user. Then as indicated in FIG. 1, further movement of the unit along path 26 will result in completion of the handoff after which the mobile unit will lose its communication link with BTS unit 12 while maintaining a link with BTS unit 22 as shown at locations 10c and 10d. Likewise, a third BTS unit such as tower 24 could be in communication with BSC 14, or alternatively and as shown in FIG. 1, BTS unit 24 could be in communication with a second controller BSC 20 such that further movement along path 26 results in mobile unit 10 losing communication with BTS unit 22 after a handoff to BTS unit 24.

As can be seen from FIG. 1, the wireless mobile unit Radio Frequency (RF) coverage of the BTS transmission unit 12 represented by the circle 28A overlaps the (RF) coverage of BTS unit 22 represented by circle 28B. As will be appreciated by those skilled in the art, such overlap is necessary if mobile unit 10 is to move along path 26 and maintain an uninterrupted communication link to the system. However, the "perfect circle" of coverage by BTS unit 12 and BTS unit 22 and the overlap may not represent the actual situation. For example, see the area of coverage of BTS unit 24 as represented by circle 28C. Large structures, the terrain (mountains and valleys) may result in very irregular transmission quality between a mobile unit 10 and any particular BTS transmission unit. Thus, data bits can easily be dropped during high speed data transmissions. As was discussed above, the loss of data bits in a data stream typically renders the data meaningless. Consequently, various schemes including redundant transmission of data packets are typically used to assure accurate transmission of data blocks.

Figure 2:
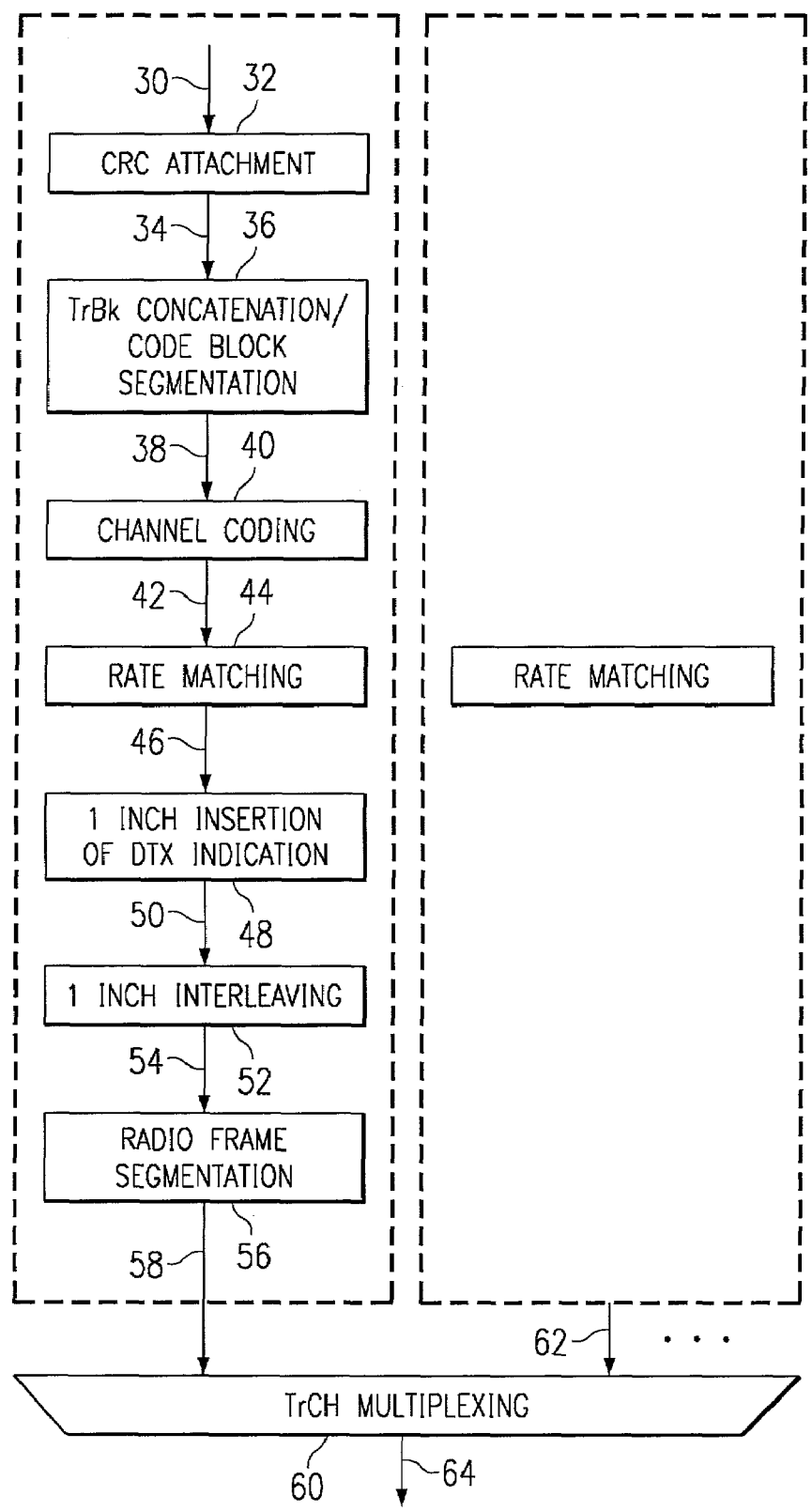
FIG. 2 illustrates downlink data flow processing prior to transmitting data from a base station to a wireless unit.

Referring now to FIGS. 2 and 3, there are shown block diagrams of various processing steps that may be applied to a data stream that is transmitted and received over a wireless communication system. FIG. 2 illustrates the flow of data for a downlink transmission from a base station to a mobile unit, and FIG. 3 illustrates the flow of data for a typical uplink transmission from the wireless mobile unit to the base station. The processing steps through channel coding are the same for both uplink and downlink transmission. As shown, data transport block 30 or a stream of data to be transmitted is received at CRC attachment circuitry 32. As will be appreciated, error detection is provided for data streams or transport blocks by means of Cylic Redundancy Check (CRC) bits added to the information or data transport blocks 30. The number of bits, or size of the CRC to be used for a typical transmission or transport channel is typically selected to be 24, 16, 12, 8 or 0 bits for each transport block as determined by higher level control circuitry. The parity bits, whether 24, 16, 12 or 8 bits in number are calculated by CRC attachment circuitry 32 using cyclic generator polynomials in a manner understood by those skilled in the art and based on the size of the transport block 30. The CRC attachment circuitry 32 then attaches the generated parity bits to the transport block of data 30 such that the data output 34 is comprised of the original data stream or transport block of data 30 plus the appropriate parity bits as calculated by CRC attachment circuitry 32.

All of the data transport blocks 30 with the CRC attachment that are received during a transmission time interval (TTI) are then serially linked or concatenated by concatenation/segmentation circuitry 36 before being sent to coding circuitry as discussed below. However, if the total number of bits of these linked transport blocks is greater than the maximum number of bits that can be included in a block of data to be coded, then the linked transport blocks of data must be segmented into selected or predetermined block sizes before being received by the coding circuitry. The selected or predetermined size of the segmented data varies according to the type of coding that will occur at coding circuitry. If the total number of bits in the linked transport blocks of data is not an integer multiple of the selected segment of the data, filler bits are set to zero and added at the beginning of the first segmented data block. The code block segmented data output 38 is then provided to Channel Coding Circuitry 40.

The type of channel coding performed on the code block segmented data received by Channel Coding Circuitry 40 may be any suitable standard coding scheme, and the scheme selected may vary depending upon the type of transport channel being used. For example, Broadcast Channels (BCH), Paging Channels (PCH) and Random Access Channels (RACH) may select "Convolution Coding" having a ½ coding rate. On the other hand, a Common Control Physical Channel (CCPCH), a Dedicated Channel (DCH), a Downlink Shared Channel (DSCH) and a Forward Access Channel (FACH) may be "Convolution Codes" at a ½ or a ⅓ rate. Alternately, these type channels may be "Turbo" coded at a ⅓ rate or not be coded at all. Persons skilled in the art will be familiar with the various available coding techniques or schemes and consequently, they will not be discussed in detail. However, discussions covering these coding schemes may be found at "Digital Communications (4$^{th}$ Edition)" by John G. Proakis, McGraw Hill 2000; and "Turbo Codes" by B. Vucetic and J. Yuan, KAP 2000, and such information is incorporated herein by reference. Referring again to FIG. 2, it is seen that the downlink data flow path in this illustrated embodiment is different than the uplink path of FIG. 3. In the downlink data flow of FIG. 2, after channel coding is complete, the data is immediately provided to the Rate Matching Circuitry 44.

Although the operation of Rate Matching Circuitry 44 as used in the present invention is discussed in more detail hereinafter, in general the rate matching process means that selected bits on a transport channel are punctured (dropped) or repeated as necessary so that the total number of bits transmitted is equal to the "bits/time slot (frame) rate" selected or changed for the transmission as determined at a higher control level and, according to this invention, by the size of the buffer in the mobile unit.

The number of bits on a transport channel can vary between different transmission time intervals. In the downlink data flow, the transmission of data is simply interrupted or put on hold if the number of bits being transmitted is lower than maximum.

After the rate matching process the output 46 may be routed to circuitry 48 for inserting a "discontinue transmission" indicator (DTX), however, this step is not necessary for a system configured according to the teaching of the present invention, since the Rate Matching Circuitry 44 of the present invention will fill all bit locations in a transport channel. Thus, connection line 46, dotted line 48A, and connection line 50 illustrate the output of Rate Matching Circuitry 44 may be provided directly to Interleaving Circuitry 52. The data flow is then provided on path 50 to the Interleaving Circuitry 52, which introduces "P" bits connected to the first bits of compressed radio frames. As will be understood by those skilled in the art, these "P" bits will be removed during multiplexing to create an actual gap between radio frames. The output bit sequence 54 from Interleaving Circuitry 52 is then provided to Radio Frame Segmentation Circuitry 56.

Radio Frame Segmentation Circuitry 56 will divide or segment the bit sequence received from Interleaving Circuitry 52 if the transmission time interval (TTI) is greater than 10 ms. As can be seen from FIG. 3, in the uplink data flow, this segmented data output occurs before rate matching and instead of being provided to a transport Channel Multiplexer is provided to Rate Matching Circuitry 44, which operates similar to Rate Matching Circuitry 44, discussed above. The radio frame segment length is selected so that after processing in the Rate Matching Circuitry 44, the input sequence length of the radio frame will be an integer multiple of the radio frames. As shown in FIG. 2 in the downlink transmission the output 58 from Radio Frame Segmentation Circuitry 56 is provided to the Transport Channel Multiplexing Circuitry 60.

As illustrated, the output 46 from Rate Matching Circuitry 44 is routed to Multiplexing Circuitry 60 where it is combined with a multiplicity of similar data stream as indicated by input 62. As will be appreciated by those skilled in the art, the output 64 from Multiplexing Circuitry 60 may then be further processed before being physically mapped onto one or more transport channels as indicated at 66 and then broadcast over the radio link.

Referring now to FIG. 3, differences in the uplink data flow from the downlink data flow as previously mentioned will now be discussed.

At the completion of the channel coding, by coding circuitry 40 in the uplink, if segmentation of the data occurred before coding, that is, if more than one block of the coded data was required, then the encoded data output blocks at 42 are again serially linked or concatenated before being sent from the coding circuitry 40 to the Radio Frame Equalization Circuitry 68 in the uplink data flow. After interleaving at circuitry 52A and radio frame segmentation at 56A, which operates substantially the same as this type circuitry in the downlink, the data flow goes to Rate Matching Circuitry 44 in the downlink data flow.

Radio Frame Equalization Circuitry 68 is only used in the uplink data flow and simply pads the bit sequence to ensure that the final output data stream can be divided into equal segments after rate matching to be discussed later. The output 70 from the Radio Frame Equalization Circuitry 68 is then provided to Interleaving Circuitry 52A and then to Radio Frame Segmentation Circuitry 56A in a manner similar to Interleaving Circuitry 52 and Radio Frame Segmentation Circuitry 56 discussed above.

If the number of bits between different transmission time intervals in the uplink is changed, bits are repeated or punctured to ensure that the total bit rate after the multiplexing onto the transport channel is identical to the total channel bit rate of the allocated dedicated physical channels.

Referring now to FIG. 4, there is shown rate matching methods and apparatus from the transmission side 72 to the receiving side 74 of a transmission. Although at present there is no real demand to increase the throughput during an uplink transmission, it will be appreciated that the advantages of this invention may also be used during an uplink transmission. Therefore, FIG. 4 is discussed with respect to a downlink transmission, but with minor adjustments, which should be apparent to those skilled in the art, is equally applicable to an uplink transmission.

As shown in FIG. 2, the channel coding processing as indicated at 40 provides inputs to the Rate Matching Circuitry 44. It will be recalled that various types of channel encoding may be suitable for use with the invention. However, Turbo coding having a ⅓ rate has been found to be particularly suitable for the present invention. Therefore, in the illustrated embodiment as discussed below, the encoding circuitry 40 is a "Turbo Encoder" which provides a first output 76A carrying the information bits and the CRC attachment bits referred to hereinafter as "systematic bits". A second output 76B carries a first set of parity bits and a third output 76C carries a second set of parity bits. The outputs 76A, 76B and 76C are provided to a First Rate Matching Circuit 78, which is discussed hereinafter.

Referring now to FIG. 5, there is a discussion of Turbo Coding. The scheme of Turbo coder is a Parallel Concatenated Convolutional Code (PCCC) with two 8-state constituent encoders 80 and 82 and one Turbo code internal interleaver 84. Except for trellis termination convection as discussed below, constituent encoders 80 and 82 have identical operations. A major difference however is, of course, that the information data stream is processed by the internal interleaver 84 before being encoded at encoder 82.

The transfer function of the 8-state constituent code for PCCC is:

$$G(D) = \left[1, \frac{g_1(D)}{g_0(D)}\right],$$

where $g_0(D)=1+D^2+D^3$, $g_1(D)=1+D+D^3$.

The initial value of the shift registers of the 8-state constituent encoders shall be all zeros when starting to encode the input bits.

Thus, the output from the Turbo coder is:

$x_1, z_1, z'_1, x_2, z_2, z'_2, \ldots, x_K, z_K, z'_K,$ where $x_1, x_2, \ldots, x_K$ are the bits input to the Turbo coder i.e. both first 8-state constituent encoder and Turbo code internal interleaver, and K is the number of bits, and $z_1, z_2, \ldots, z_K$ and $z'_1, z'_2, \ldots, z'_K$ are the bits output from first and second 8-state constituent encoders (80 and 82), respectively. The bits output from Turbo code internal interleaver 84 is denoted by $x'_1, x'_2, \ldots, x'_K$, and these bits are to be input to the second 8-state constituent encoder 82.

Trellis termination is performed by taking the tail bits from the shift register feedback after all information bits are encoded. Tail bits are padded after the encoding of information bits.

The first three tail bits are used to terminate the first constituent encoder 80 (upper switch 86 in lower position) while the second constituent-encoder 82 is disabled. This occurs when the last three tail bits are used to terminate the second constituent encoder 82 (lower switch 88 in lower position) while the first constituent encoder 80 is disabled.

The transmitted bits from trellis termination shall then be:

$x_{K+1}, z_{K+1}, x_{K+2}, z_{K+2}, x_{K+3}, z_{K+3}, x'_{K+1}, z'_{K+1},$
$x'_{K+2}, z'_{K+2}, x'_{K+3}, z'_{K+3}.$

The Turbo code internal interleaver consists of bits-input to a rectangular matrix with padding (not shown), intra-row and inter-row permutations of the rectangular matrix, and bits output from the rectangular matrix with pruning. The bits input to the Turbo code internal interleaver 84 are denoted by $x_1, x_2, x_3, \ldots, x_K$ where K is the integer number of the bits and takes one value of $40 \leq K \leq 5114$. The relation between the bits input to the Turbo code internal interleaver 84 and the bits input to the channel coding is defined by $x_k = o_{irk}$ and $K = K_i$.

K Number of bits input to Turbo code internal interleaver
R Number of rows of rectangular matrix
C Number of columns of rectangular matrix
P Prime number
v Primitive root
$<s(j)>_{j \in \{0, 1, \ldots, p-2\}}$ Base sequence for intra-row permutation
$q_i$ Minimum prime intergers
$r_i$ Permuted prime integers
$<T(i)>_{j \in \{0, 1, \ldots, R-1\}}$ Inter-row permutation pattern
$<U_i(j)>_{j \in \{0, 1, \ldots, C-1\}}$ Intra-row permutation pattern of i-th row
i Index of row number of rectangular matrix
j Index of column number of rectangular matrix
k Index of bit sequence The bit sequence $x_1, x_2, x_3, \ldots, x_K$ input to the Turbo code internal interleaver 84 is written into the rectangular matrix as follows:

(1) Determine the number of rows of the rectangular matrix, R, such that:

$$R = \begin{cases} 5, & \text{if } (40 \leq K \leq 159) \\ 10, & \text{if } ((160 \leq K \leq 200) \text{ or } (481 \leq K \leq 530)) \\ 20, & \text{if } (K = \text{any other value}) \end{cases}$$

The rows of rectangular matrix are numbered $0, 1, \ldots, R-1$ from top to bottom.

(2) Determine the prime number to be used in the intra-permutation, p, and the number of columns of rectangular matrix, C, such that:
if $(481 \leq K \leq 530)$ then
   p=53 and C=p.
else
Find minimum prime number p from Table 1 such that $K \leq R \times (p+1)$ and determine C such that $$C = \begin{cases} p-1 & \text{if } K \leq R \times (p-1) \\ p & \text{if } R \times (p-1) < K \leq R \times p \\ p+1 & \text{if } R \times p < K \end{cases}$$

end if
The columns of rectangular matrix are numbered $0, 1, \ldots, C-1$ from left to right.

TABLE 1

| p | v |
|---|---|
| 7 | 3 |
| 11 | 2 |
| 13 | 2 |
| 17 | 3 |
| 19 | 2 |
| 23 | 5 |
| 29 | 2 |
| 31 | 3 |
| 37 | 2 |
| 41 | 6 |
| 43 | 3 |

TABLE 1-continued

| p | v |
|---|---|
| 47 | 5 |
| 53 | 2 |
| 59 | 2 |
| 61 | 2 |
| 67 | 2 |
| 71 | 7 |
| 73 | 5 |
| 79 | 3 |
| 83 | 2 |
| 89 | 3 |
| 97 | 5 |
| 101 | 2 |
| 103 | 5 |
| 107 | 2 |
| 109 | 6 |
| 113 | 3 |
| 127 | 3 |
| 131 | 2 |
| 137 | 3 |
| 139 | 2 |
| 149 | 2 |
| 151 | 6 |
| 157 | 5 |
| 163 | 2 |
| 167 | 5 |
| 173 | 2 |
| 179 | 2 |
| 181 | 2 |
| 191 | 19 |
| 193 | 5 |
| 197 | 2 |
| 199 | 3 |
| 211 | 2 |
| 223 | 3 |
| 227 | 2 |
| 229 | 6 |
| 233 | 3 |
| 239 | 7 |
| 241 | 7 |
| 251 | 6 |
| 257 | 3 |

(3) Write the input bit sequence $x_1, x_2, x_3, \ldots, x_K$ into the R×C rectangular matrix row by row starting with bit $y_1$ in column 0 of row 0:

$$\begin{bmatrix} y_1 & y_2 & y_3 & \cdots & y_C \\ y_{(C+1)} & y_{(C+2)} & y_{(C+3)} & \cdots & y_{2C} \\ \vdots & \vdots & \vdots & \cdots & \vdots \\ y_{((R-1)(C+1)} & y_{(R-1)(C+2)} & y_{(R-1)(C+3)} & \cdots & y_{R \times C} \end{bmatrix}$$

where $y_k = x_k$ for $k=1, 2, \ldots, K$ and if R×C>K, the dummy bits are padded such that $y_k = 0$ or 1 for $k = K+1, K+2, \ldots, R \times C$. These dummy bits are pruned away from the output of the rectangular matrix after intra-row and inter-row permutations.

After the bits-input to the R×C rectangular matrix, the intra-row and inter-row permutations fro the R×C rectangular matrix are performed stepwise by using the following algorithm with steps (1)-(6):

(1) Select a primitive root v from Table 1, which is indicated on the right side of the prime number p.

(2) Construct the base sequence $<s(j)>_{j \in \{0, 1, \ldots, p-2\}}$ for intra-row permutation as:

$s(j) = (v \times s(j-1)) \bmod p, j = 1, 2, \ldots, (p-2),$ and $s(0) = 1.$ (3) Assign $q_0 = 1$ to be the first prime integer in the sequence $<q_i>_{i \in \{0, 1, \ldots, R-1\}}$, and determine the prime integer $q_i$ in the sequence $<q_i>_{i \in \{0, 1, \ldots, R-1\}}$ to be at least prime integer such that $g.c.d(q_i, p-1)=1, q_i>6$, and $q_i>q_{(i-1)}$ for each $I=1, 2, \ldots, R-1$. Here g.c.d. is greatest common divisor.

(4) Permute the sequence $<q_i>_{i \in \{0, 1, \ldots, R-1\}}$ to make the sequence $<r_i>_{i \in \{0, 1, \ldots, R-1\}}$ such that $r_{T(i)} = q_i, i=0, 1, \ldots, R-1$ where $<T(i)>_{i \in \{0, 1, \ldots, R-1\}}$ is the inter-row permutation pattern defined as the one of the four kind of patterns, which are shown in Table 2, depending on the number of input bits K.

TABLE 2

| Number of input bits K | Number of rows R | Number of Inter-row permutation patterns <T(0), T(1), ..., T(R-1)> |
|---|---|---|
| (40 ≤ K ≤ 159) | 5 | <4, 3, 2, 1, 0> |
| (160 ≤ K ≤ 200) or (481 ≤ K ≤ 530) | 10 | <9, 8, 7, 6, 5, 4, 3, 2, 1, 0> |
| (2281 ≤ K ≤ 2480) or (3161 ≤ K ≤ 3210) | 20 | <19, 9, 14, 4, 0, 2, 5, 7, 12, 18, 16, 13, 17, 15, 3, 1, 6, 11, 8, 10> |
| K = any other value | 20 | <19, 9, 14, 4, 0, 2, 5, 7, 12, 18, 10, 8, 13, 17, 3, 1, 16, 6, 15, 11> |

(5) Perform the i-th (i=0, 1, ..., R-1) intra-row permutation as:

if (C=p) then
$U_i(j) = s((j \times r_i) \bmod (p-1)), j=0,1, \ldots, (p-2), U_i(p-1)=0,$
and
$U_i(p)) = p,$
where $U_i(j)$ is the original bit position of j-th permuted bit of i-th row.
end if
if (C=p+1) then
$U_i(j) = s((j \times r_i) \bmod (p-1)), j=0,1, \ldots, (p-2), U_i(p-1)=0,$
and
$U_i(p) = p,$
where $U_i(j)$ is the original bit position of j-th permuted bit of i-th row, and
if (K=R×C) then
Exchange $U_{R-1}(p)$ with $U_{R-1}(0)$.
end if
end if
if(C=p-1) then
$U_i(j) = s((j \times r_i) \bmod (p-1))-1, j=0,1, \ldots, (p-2).$
where $U_i(j)$ is the original bit position of j-th permuted bit of i-th row.
end if (6) Perform the inter-row permutation for the rectangular matrix based on the pattern $<T(i)>_{i \in \{0, 1, \ldots, R-1\}}$, where T(i) is the original row position of the i-th permuted row.

After intra-row and inter-row permutations, the bits of the permuted rectangular matrix are denoted by $y'_k$:

$$\begin{bmatrix} y'_1 & y'_{(R+1)} & y'_{(2R+1)} & \cdots & y'_{((C-1)R+1)} \\ y'_2 & y'_{(R+2)} & y'_{(2R+2)} & \cdots & y'_{((C-1)R+2)} \\ \vdots & \vdots & \vdots & \cdots & \vdots \\ y'_R & y'_{2R} & y'_{3R} & \cdots & y'_{C \times R} \end{bmatrix}$$

The output of the Turbo code internal interleaver 84 is the bit sequence read out column by column from the intra-row and inter-row permuted R×C rectangular matrix starting with bit $y'_1$ in row 0 of column 0 and ending with bit $y'_{CR}$ in row R-1 of column C-1. The output is pruned by deleting dummy bits that were padded to the input of the rectangular matrix before intra-row and inter-row permutations, i.e. bits $y'_k$ that correspond to bits $y_k$ with k>K are removed from the output. The bits output from Turbo code internal interleaver 84 are denoted by $x'_1, x'_2, \ldots, x'_K$, where $x'_1$ corresponds to the bit $y'_k$ with smallest index k after pruning, $x'_2$ to the bit $y'_k$ with second smallest index k after pruning, and so on. The number of bits output from Turbo code internal interleaver is K and the total number of pruned bits is: R×C−K, and the Turbo Encoder 40 outputs are provided to Rate Matching Circuitry 44 at the transmission side 72.

Referring again to FIG. 4, the three inputs 76A, 76B and 76C are provided to the Rate Matching Circuitry 44. The Rate Matching Circuitry 44 of the present invention, accomplishes the processing in two stages as indicated by the first rate matching circuitry 78 and the second rate matching circuitry 90. The two-state rate matching allows flexibility in the users mobile equipment. For example, the number of bits that can be transmitted between a base station 12 and a mobile unit 10 such as shown in FIG. 1 during a transmission cycle is not very flexible since the number of bit locations in a time slot or frame is a fixed number. There may be some limited choices as to the number of bits per time slot or frame, but the choices only provide a rather coarse selection.

As an example only, the control circuitry (not shown at the base station) may select between a transmission bit rate of 10 bits/time slot (frame), 20 bits/frame or 30 bits/frame. According to the same example, if the transmission rate is 10 bits per frame, you cannot transmit at a 12 bit per frame rate. The control circuitry must select the next highest rate of 20 bits per time slot or frame. This means 8 bits must be zero-padded or wasted. This is very inefficient. Rate matching, as presently used, helps solve this problem by simply throwing away (puncturing) two of the 12 bits such that the total bits per frame to be transmitted is 10 bits. However, the loss of 2 bits per frame does not cause a difficult problem since the 12 original information and CRC bits have been forward error corrected (FEC) encoded by the encoding circuitry 40 and, as will be appreciated, there is redundancy as a result of the first and second sets of parity bits.

Therefore, by passing the data stream received by the mobile unit to an FEC decoder, the original bit sequence can be recovered since we will primarily be throwing away some of the redundant parity bits generated by the encoding process. In the event the bit rate of the information data to be transmitted was only 9 bits/time slot, a selected one of the bits would be repeated rather than zero-padded. Therefore, it is possible that for some transmitted data frames, the FEC decoder may be more efficient since the information bits and the repeated bits can be compared. Therefore, it is seen that if the number of bits/frame to be transmitted is different from the bits/frame transmission rate selected by the system, bits must either be punctured or repeated. If too many bits are punctured, efficiency suffers and analyses may be desirable to determine which is the best option. As a rule of thumb, the number of bits punctured is typically limited to between about 1870 to 2570.

If all mobile units or user equipment had the same capabilities, the use of rate matching as is presently practiced might be adequate. Unfortunately, user equipment or mobile units from different sources are designed and manufactured with different capabilities. Therefore, it is desirable that new wireless systems and/or standards be flexible enough so that all types of user equipment can be serviced.

It will also be appreciated by those skilled in the art that wireless or mobile connection devices or units will inevitably experience the loss of data bits and/or a temporary break in the communication link. This can result from environmental obstruction momentarily coming between the base station and the wireless unit as the wireless unit moves along a path or roadway. Alternately, a large moving vehicle could interrupt the transmission path and cause the loss of data bits or a break in the communication link. Other causes for a communication link breakdown could be weather, radiation from various types of equipment, or any other of a myriad of causes. In any event, the momentary effect of such occurrence results in dropped or corrupted data bits. As was discussed above, for voice communication, these dropped bits may be manifested by nothing more than momentary static or a missed word or two. However, if a block of digital data is being transmitted at high speed bit rates, the failure to recover a single data bit could render significant chunks of the data, if not the complete transmission, completely useless. The use of encoders, such as the Turbo Encoder 48 to generate parity bits as will be appreciated by those skilled in the art, allows the recover or reconstruction of the missing data bits much more efficiently and may avoid the need for one or more retransmissions of the information data. However, as was discussed above, by rate matching, a significant number of the transmitted parity bits are discarded. Therefore, it is important to provide techniques for data recovery or reconstruction with a reduced number of parity bits and the minimum amount of retransmission. One technique to help reduce the number of retransmissions to a minimum is referred to as incremental redundancy (IR). Incremental redundancy is an HARQ (Hybrid Automatic Repeat Request) scheme wherein a different version of redundancy data is transmitted in response to the HARQ or retransmission request. This is different from conventional ARQ schemes where retransmitted data packets are always identical to the original or first transmission.

As will be discussed in detail below, and according to the present invention, a different data packet or redundancy version (RV) is transmitted in response to an HARQ. More specifically, subsequent transmissions after an HARQ are comprised of different redundancy versions which are made up of different parity bits from the encoder 40 than was used in the original or first transmission. For example, in the original or first transmission specific ones of the parity bits generated by FEC encoding (Turbo Encoder) are transmitted and the rest are "punctured" or "repeated" as appropriate. Then, in the event the CRC (Cyclic Redundancy Check) does not pass and a second transmission is requested (i.e. HARQ), a different RV selects a different group of bits to puncture (repeat) and transmit. Of course, even though there will be significant differences, some of the individual bits transmitted and punctured (repeated) in the second transmission will be the same as some of the bits transmitted and punctured (repeated) in the first transmission. The bits of the first and second transmission will then be combined in a manner discussed below and the results of this combination will again be provided to an FEC decoder and subjected to another CRC. If the CRC still fails to pass, the process will be repeated with one or more different RV's until the CRC passes. It will be appreciated that since the bits of the second transmission are to be combined with the bits of the first transmission, it is necessary for the mobile unit to store the first transmission bits. Likewise, the bits of the second transmission that are different from the first transmission bits must also be stored. If the decoded data still does not pass the CRC, a third transmission will be required. Thus, since each different RV transmits and/or punctures (repeats) different bits, it is seen that for each additional transmission following an HARQ more buffer or storage space is used. However, as discussed above, the various manufacturers of wireless or mobile units design and build their equipment with different specifications and capabilities. More specifically, different manufacturers build their mobile units with different storage or buffering capabilities, and none of the manufacturers can include an infinite amount of memory. Therefore, if a new system or standard is to be readily accepted the system must be flexible enough to accommodate wireless units with widely varying buffer sizes. As a result, and according to the present invention, restrictions are placed on the size of the second, third and fourth transmissions since, if there were no limits or restrictions, the user equipment or wireless unit buffer memory could overflow rendering the previous transmissions useless. Furthermore, since each manufacturer may have included different sizes of buffer memories in their product, it is necessary to have some procedure or method which effectively uses all of the available buffer memory while at the same time avoiding buffer overflow.

According to one 3G (third generation) proposed system using rate matching, the rate matching parameters of the first rate matching circuitry 78 are set out in Table 3.

The following detailed discussion is limited to rate matching by "puncturing" which is the more difficult case. However, it should be understood that appropriate rate matching can be accomplished by "repeating" selected bits.

TABLE 3

| Systematic bits | $1^{st}$ parity bits | $2^{nd}$ parity bits |
|---|---|---|
| No puncturing | $\Delta N = [\Delta N^{TTI}/2]$<br>$X = N^{TTI}/3$<br>$e_{ini} = X$,<br>$e_{plus} = 2 \times X$,<br>$e_{minus} = 2 \times |\Delta N|$ | $\Delta N = [\Delta N^{TTI}/2]$<br>$X = N^{TTI}/3$<br>$e_{ini} = X$,<br>$e_{plus} = X$<br>$e_{minus} = 2 \times |\Delta N|$ | where
$N^{TTI}$=number of encoded Turbo bits
$\Delta N^{TTI}$=total number of bits to be punctured
$e_{ini}$=initial value of variable e in the rate matching pattern determination algorithm
$e_{plus}$=increment of variable e in the rate matching pattern determination algorithm
$e_{minus}$=decrement of variable e in the rate matching pattern determination algorithm Therefore, to meet the rate matching parameters of Table 3, and to efficiently accommodate both wireless units with a maximum buffer size and wireless units with minimum buffer sizes, the present invention also provides methods and apparatus using incremental redundancy IR and "Chase Combining".

When "Chase Combining" is used, the soft values of the first transmission bits and the soft values of the second transmission bits are "soft-combined" to obtain a "resultant soft value". A log likelihood for the soft metric defined as Log(P(1/r)/P(1/r)), is used for this process. In this process P(1/r) is a conditional probability that "1" is transmitted when "r" is received. This means that the numbers can be positive or negative such that if a hard decision is then made, a positive value will be "1" and a negative value will be "0". Since this is a probability, multiplication is used for the combined probability. To assure that the "chase combining" can be carried out in an accumulator, the process is carried out in the log domain. In a very simplified explanation of soft-combining that admittedly is not precise but should help in understanding of the process, a first transmitted bit may be received as a soft value of 0.75 and a second transmitted bit may be received as 0.35. These values may be converted to hard values of "1" and "0" respectively and then used for a CRC. However, if these values represent first and second transmission of the same bit, combining the equivalent "hard values" would result in a soft value of 0.5 and one still does not know if the bit is a "1" or a "0". On the other hand, if the 0.35 and 0.75 bits are combined as soft values, the resulting soft value is 0.55

$$\left(\text{i.e. } \frac{0.35 + 0.75}{2}\right)$$

which can then be converted to a hard value of "1" to be used in a CRC.

In any event, it will be appreciated that every wireless or mobile unit must have a buffer which is somewhat greater than the total number of bits transmitted over the transport channel during the first transmission so that the selection of parity bits included in the transmission and all of the information bits and CRC bits can be stored. Then, when the first transmission fails to pass CRC, there must be sufficient buffer storage to allow different parity bits recovered during a second transmission and which uses a second RV to also be stored. The same information bits and the same parity bits may then be "Chase Combined" and stored in the same location. However, the different parity bits resulting from a subsequent transmission with a different RV are stored in different locations. It is the storage of these different parity bits from different RV's that require additional storage over and above the size of the total number of bits transmitted during an original transmission. Consequently, if all of the different parity bits from subsequent transmissions were to be stored, the mobile units buffer would eventually overflow.

Now, referring again to FIG. 4, the two-stage rate matching using incremental redundancy (IR) of this invention is discussed further.

As discussed above, FIG. 4 shows a transmitter portion 72 and a receiver portion 74 according to one embodiment of the invention. On the transmitter side, a rate matching block 44 consists of the first rate matching circuit 78, a second rate matching circuit 90 and a "virtual" IR buffer 92 which is "set" so that it is the same size as the buffer in the wireless or mobile unit. The "virtual" IR buffer 92 size is selected so that "puncturing" (removing) the Turbo Encoded bits results in the number of bits remaining after the first stage of the rate matching process is finished being equal to the user equipment or mobile's IR buffer size which is also the size of the virtual buffer 92. The rules controlling the first rate matching according to this invention are in compliance with agreed standards for 3G systems. As was discussed above, it should also be appreciated that if the "virtual" IR buffer 92 is larger than the data frame, selected bits will be repeated "rather than punctured".

The second rate matching circuit 90 further punctures (repeats) the bits stored in the virtual IR buffer 92 so that the final number of bits is equal to the actual physical channel size (i.e., bits in the data stream transmitted over a transport channel) before physical channel segmentation as was discussed above. The rate matching pattern of the second stage rate matching circuitry 90 is controlled by a selection of RV's (redundancy versions) which control the bit make-up of a transmitted packet. As a result, it is necessary to perform bit recovery or second stage de-rate matching according to the same incremental redundancy version at the receiver. The details of the parameter settings controlling the RV's of the second rate matching circuitry 90 is described below.

At the receiver side 74, bit recovery or second de-rate matching occurs as the data stream is passed to de-rate matching circuitry 94 applied after the physical channel de-segmentation by using the rate matching pattern determined by the selected redundancy version used during transmission of the packet. The bit sequence that results after the second de-rate matching is stored in the IR buffer 96. A first de-rate matching or bit recovery circuit 98 then corrects the size of the bit sequence stored in the IR buffer 96 so that the number of output bits matches the output from the Turbo Encoder 48. Finally, the bits from the first de-rate matching circuit 98 are decoded by Turbo Decoder 100. Since a different rate matching pattern is applied to the received data stream by the second de-rate matching for circuitry 94 retransmitted packets, the IR buffer 96 is gradually filled with received sequences in each retransmission by adding the different retransmitted bits to the sequence already in the IR buffer 96. Typically, the RV and the different parity bits transmitted during the original and two retransmissions will fill IR buffer 96.

More specifically, circuitry 72 of FIG. 4 is a simple block diagram of the coding chain in the base station side. The data with CRC bits attached is given to Turbo Encoder 48 having a rate of ⅓. Systematic bits are the same data sequence provided to the encoder. Parity 1 and parity 2 bits are the redundancy bits. Virtual IR buffer 92 is of a size which emulates the user equipment or mobile unit buffer in the transmitter or base station side. This process is called the first rate matching. For example, if the size of the data packet including the information bits and the CRC bits is 100 total bits, the output of Turbo Encoder 48 will be 300 bits. If the user equipment or wireless unit has only a 240-bit buffer in the receiving chain, the rate matching is designed to change the number of bits from 300 bits to 240 bits. Therefore, it is seen that 60 bits will be punctured or discarded by the first rate matching circuitry 78. The first stage rate matching may proceed in the same manner as discussed above with respect to Table 3. If, however, the data packet was equal to 80 total bits, the output of the Turbo Encoder will be 240 bits and no first stage rate matching is required. On the other hand, if the output of the Turbo Encoder was 210 bits, the rate matching circuitry would repeat 30 bits.

In the second rate matching circuitry 90, the rate matching punctures (repeats) a sufficient number of bits so that the total number of bits in the packet is equal to the number of bits transmitted by the physical channel. If the physical channel transmits 180 bits in one packet, then 60 bits will be punctured by second rate matching circuitry 90 (i.e., 240–180=60). 180 bits are then transmitted via a radio link as a packet from the base station to the mobile or user equipment. However, if the physical channel transmits 300 bits in one packet, the second rate matching circuitry 90 will repeat 60 bits.

If the first packet of 180 bits is not correctly decoded in the wireless or mobile unit (i.e., CRC check does not pass), the base station will select and use a different second stage rate matching pattern (RV) to send another set of 180 bits again using the second rate matching process. This selection is referred to herein as "redundancy version for IR". Thus, in the second transmitted packet, some of the same bits are sent, and others are transmitted for the first time and stored in the IR buffer 96. This is possible because there are more than 180 bit locations in the virtual IR buffer 92.

As shown at 74 in FIG. 4, the process in the receiver or mobile unit side is discussed. This process is opposite to the process of the transmitter side. After receiving a packet of bits, the second de-rate matching circuit 94 de-matches a data packet and stores the bits in the IR buffer 96. Then the mobile unit or user equipment first de-rate matching circuitry 98 de-rate matches the packet to provide the received soft bits to the Turbo Decoder 100. After the Turbo decoding is completed, the user equipment or mobile unit makes a cyclic redundancy check on this packet. If the CRC is not passed, the user equipment transmits a NACK (not acknowledged) signal to the base station. The base station then retransmits the same information data bits as a data packet but with different redundancy parity bits. After the user equipment or wireless unit receives this second data packet, and de-rate matches the data stream or packet at the second de-rate matching circuitry 94, it is combined in the IR buffer 96 with the previously received data packet. (The two are simply added as soft values.) Then again, as before, the packet is de-rate matched by the first de-rate matching circuitry 98 and provided to the Turbo Decoder 100. This process is repeated again if the CRC fails. Thus, each time the base station transmits a data packet with a different redundancy version, the user equipment or mobile unit combines it with previously stored packets until the CRC for that information data packet passes.

At this point it should be understood that the rate matching pattern of the second stage rate matching circuitry 94 is determined by the redundancy version of the packet. The second stage de-rate matching circuitry 94 recognizes the RV redundancy version and makes use of the specific incremental redundancy pattern at the receiver.

The rate matching pattern that shows which bits are transmitted and which bits are not transmitted (punctured) is determined by the number of bits before and after rate matching and also by some initialization parameters. In the second stage of the rate matching process, parameters are changed depending upon which redundancy version is being sent.

Three redundancy version patterns are set out in Table 4 below for rate matching requiring "puncturing", and are only intended as examples, since the redundancy versions may be substantially unlimited. However, the principle of second rate matching in each of the redundancy version RV examples is briefly set out below.

1. Redundancy Version I—The basic rule is that all systematic bits (information bits and CRC bits) are transmitted. Parity bits 1 and parity bits 2 are punctured equally.
2. Redundancy Version II—All first parity bits are transmitted. The systematic bits are punctured as much as possible. If the number of systematic bits is not sufficient and it is necessary to puncture more bits, the second parity bits are punctured as necessary.
3. Redundancy Version III—All second parity bits are transmitted. The first parity bits are punctured as much as possible. If it is necessary to puncture more bits, the systematic bits will be punctured as necessary.

Therefore, using these three redundancy versions, three transmissions will typically fill all bit locations for the soft bits necessary for a Turbo Decoder with a rate of ⅓.

Table 4 set out below defines in more detail the strategy of the three redundancy versions mentioned above for second rate matching. However, it should be understood that the redundancy version RV of Table 4 represents only one example of two-stage rate matching, and if one rate matching parameter is changed, for example, another rate matching pattern occurs. Thus, Table 4 defines the number of bits punctured or removed from the total number of bits received from the Turbo Encoder. The Turbo Encoder has three output ports. One is called "systematic" which is basically the same as the information bits plus the CRC bits. That is, the information provided to the Turbo Encoder. The second and third ports are called "parity" ports which provide redundant bits used in the decoder for error correction.

TABLE 4

| R.V. | | |
|---|---|---|
| 1 | a | y: The number of total bits to be punctured by $2^{nd}$ RM. If y = 0, $2^{nd}$ RM is not applied. |
| | b | All systematic bits are to be transmitted. |
| | c | Puncture the $1^{st}$ parity bits by $\lfloor \frac{y}{2} \rfloor$. |
| | d | Puncture the $2^{nd}$ parity bits by $\lceil \frac{y}{2} \rceil$. |
| 2 | a | x: The number of the systematic bits. y: The number of total bits to be punctured by $2^{nd}$ RM. y < 0. If y = 0, $2^{nd}$ RM is not applied. |
| | b | z = x − y |
| | c | If z ≥ 0, puncture the systematic bits by y. All $1^{st}$ parity bits and $2^{nd}$ parity bits shall be transmitted. |
| | d | If z < 0, all systematic bits shall be punctured. All $1^{st}$ parity 1 bits shall be transmitted. Puncture $2^{nd}$ parity bits by z. |
| 3 | a | x: The number of parity 1 bits after first RM. y: The number of total bits to be punctured by $2^{nd}$ RM. y > 0. If y = 0, $2^{nd}$ RM is not applied. |
| | b | x − y |
| | c | If z ≥ 0, puncture the $1^{st}$ parity bits by y. All systematic bits and $2^{nd}$ parity bits shall be transmitted. |
| | d | If z < 0, all $1^{st}$ parity bits shall be punctured. All $2^{nd}$ parity bits shall be transmitted. Puncture the systematic bits by z. |

The parameter bits for the second rate matching process are determined as demonstrated in Table 5 below.

$N^{TTI}$: the number of bits after Turbo Encoder, $\Delta N_{1st}^{1}$: the number of $1^{st}$ parity bits punctured by $1^{st}$ rate matching, $\Delta N_{1st}^{2}$: the number of $2^{nd}$ parity bits punctured by $_{1}$st rate matching, $\Delta N_{2nd}$: the total number of bits to be punctured by $2^{nd}$ rate matching.

Thus, Table 5 shows the specific parameters for two-stage rate matching and defines the number of bits punctured (delta N) and the initialization parameters (such as e_ini) for the puncturing pattern. The puncturing pattern is basically uniform over the transmitted bits determined by these initialization parameters.

To further assist understanding of the process, an example of rate matching parameter calculation is described below. The initial parameters for the example shown in Table 6, and calculated first and second rate matching parameters are described in Tables 7 and 8, respectively.

TABLE 6

| | |
|---|---|
| Modulation and coding scheme | 16QAM R = 3/4 |
| The number of code for physical channel | 1 |
| The number of physical channel bits | 1920 |
| Transport channel bits | 1424 |
| CRC | 16 |
| IR buffer size | 2523 |
| The number of Turbo encoded bits: $N^{TTI}$ | 3 * (1424 + 16) + 12 = 4332 |
| The total number of punctured bit by $1^{st}$ RM: $\Delta N^{TTI}$ | 2523 − 4332 = −1809 |
| The total number of punctured bits by $2^{nd}$ RM: $\Delta N_{2nd}$ | 1920 − 2523 = −603 |

Table 6 summarizes the channel parameters for a specific example. The example is for 16QAM (quadrature amplitude modulation) having a coding rate of ¾. The rate defined here is actually the rate of each packet, which is not the final rate after Hybrid ARQ process. The example case is this specific modulation and coding rate, but the result is similar to other modulation and coding rates. The two-stage rate matching is applicable to any modulation (16QAM or QPSK), coding scheme (Turbo or Convocational Coding) and coding rate (½, ¾... Any fractional rate), assuming this is enough soft buffer which is capable of storing uncoded bits.

The number of code is indicated as 1, for simplicity. In one HSDPA standard, up to 15 code channels are used for

TABLE 5

| R.V. | Systematic bits | $1^{st}$ parity bits | $2^{nd}$ parity bits | Note |
|---|---|---|---|---|
| 1 | No puncture | $\Delta N = \lfloor \Delta N_{2nd}/2 \rfloor$<br>$X = N^{TTI}/3 + \Delta N^{1}_{1st}$<br>$e_{ini} = X$<br>$e_{plus} = 2 \times X$<br>$e_{minus} = 2 \times \|\Delta N\|$ | $\Delta N = \lceil \Delta N_{2nd}/2 \rceil$<br>$X = N^{TTI}/3 + \Delta N^{2}_{1st}$<br>$e_{ini} = X$<br>$e_{plus} = X$<br>$e_{minus} = \|\Delta N\|$ | |
| 2 | If z ≥ 0<br>  $\Delta N = y$<br>else<br>  $\Delta N = -x$<br>end<br>$X = N^{TTI}/3$<br>$e_{ini} = X$<br>$e_{plus} = X$<br>$e_{minus} = \|\Delta N\|$ | No puncture | If z ≥ 0<br>  $\Delta N = 0$<br>else<br>  $\Delta N = z$<br>end<br>$X = N^{TTI}/3 + \Delta N^{2}_{1st}$<br>$e_{ini} = X$<br>$e_{plus} = 2 \times X$<br>$e_{minus} = 2 \times \|\Delta N\|$ | $x = N^{TTI}/3$<br>$Y = \Delta N_{2nd}$<br>$z = x + y$ |
| 3 | If z ≥ 0<br>  $\Delta N = 0$<br>else<br>  $\Delta N = z$<br>end<br>$X = N^{TTI}/3$<br>$e_{ini} = X$<br>$e_{plus} = 2 \times X$<br>$e_{minus} = 2 \times \|\Delta N\|$ | If z ≥ 0<br>  $\Delta N = y$<br>else<br>  $\Delta N = -x$<br>end<br>$X = N^{TTI}/3 + \Delta N^{1}_{1st}$<br>$e_{ini} = X$<br>$e_{plus} = X$<br>$e_{minus} = \|\Delta N\|$ | No puncture | $x = N^{TTI}/3 + \Delta N^{1}_{1st}$<br>$y = \Delta N_{2nd}$<br>$z = x + y$ | downlink packet channel. These 15 channels can be transmitted simultaneously from the base station depending on the traffic. The two-stage rate matching can be used for any number of code channels by changing parameters.

Physical channel bits are the bits available at a physical channel, or the raw bits which are actually transmitted by the physical channel. That is, this is the number of bits after the second rate matching process of circuitry 90. The number of bits depends on the slot format of the downlink packet access channel, so it is an integer multiple of 1920 for 16QAM cases, and for a QPSK transmission, the amount is half. The integer multiple is determined by the number of code channels.

Transport channel bits are the information bits. The information bits and 15 CRC bits are input to Turbo Encoder 48. Therefore, the output of Turbo Encoder 48 is 3×(1424+16)+12. The amount is multiplied by 3 because there is one systematic and two parity output ports as discussed above. Twelve of the bits are termination bits. In the example discussed above it was assumed the IR buffer size equaled 2523 (the number of soft bits stored), so that it would be necessary to puncture 1809 bits (4332->2523) at the first rate matching and then puncture 603 bits (2523->1920) at the second rate matching.

TABLE 7

| Systematic bits | 1st parity bits | 2nd parity bits |
| --- | --- | --- |
| No puncturing | $\Delta N = \lfloor \Delta N^{TTI}/2 \rfloor = -904$<br>$X = N^{TTI}/3 = 1444$<br>$e_{ini} = X = 1444$<br>$e_{plus} = 2 \times X = 2888$<br>$e_{minus} = 2 \times |\Delta N| = 1808$ | $\Delta N = \lfloor \Delta N^{TTI}/2 \rfloor = -905$<br>$X = N^{TTI}/3 = 1444$<br>$e_{ini} = X = 1444$<br>$e_{plus} = X = 2888$<br>$e_{minus} = |\Delta N| = 905$ |

From Table 7, $\Delta N_{1st}^1 = -904$, (this is the number of punctured bits from parity 1 sequence at the first rate matching.)

$\Delta N_{1st}^2 = -905$, (the number of punctured (discarded) bits from parity 2 sequence, and all the systematic bits are transmitted.)

In order to confirm basic link level performance of the two-stage rate matching method, computer simulations were conducted under an AWGN (Additive White Gaussion Noise) environment. Simulation conditions are shown in Table 9.

TABLE 9

| Parameter | Value |
| --- | --- |
| Carrier Frequency | 2 GHz |
| Propagation conditions | 1 path |
| Channel | AWGN, Rayleigh fading (92.6 Hz) |
| CPICH relative power | 10% (−10 dB) |
| $E_c/I_{or}$ | −1 dB |
| Closed loop power control | OFF |
| HSDPA frame length | 2 ms (3 slots) |
| Spreading factor | 16 |
| $I_{or}/(I_{oc} + N_o)$ | Variable |
| Channel Estimation | Ideal |
| Modulations | 16QAM, 64QAM |
| Channel coding | Rel'99 Turbo code (PCCC), Rate ½ and ¾ |
| Max no. of iterations for Turbo Coder | 8 |
| Metric for Turbo Coder | Max-log MAP |
| Input to Turbo Decoder | Soft |
| Number of rake fingers | 1 |
| Transmitter delivery | STTD is not applied |
| Channel interleaving | Random |

The technical terms used are explained below:

CPICH (Common Pilot Channel): This is a downlink reference channel used for phase reference, and chip synchronization. The similar channel in IS-95 is identified as a "Pilot Channel", the function of the two is basically the same.

Ec/Ior: The ration of chip-level energy (Ec) of Downlink Packet Channel and the total downlink power (Ior).

Spreading Factor 16: One physical channel bit is spread by 16 chips of downlink channelization code and scrambling sequence.

Ior/(Ioc+N0): Ioc is the interference power from other cells and "No" is the thermal noise.

Modulations: Simulation results were presented for 16QAM and 64QAM cases. The rate matching scheme is applicable in the same way as QPSK or 16QAM.

Channel Coding: The example used is for the Turbo Decoding as discussed above. As explained above, there is no restriction to the coding scheme. Thus, the

TABLE 8

| R.V. | Systematic bits | 1st parity bits | 2nd parity bits | Note |
| --- | --- | --- | --- | --- |
| 1 | No puncture | $\Delta N = \lfloor \Delta N_{2nd}/2 \rfloor = -301$<br>$X = N^{TTI}/3 + \Delta N^1_{1st} = 540$<br>$e_{ini} = X = 540$<br>$e_{plus} = 2 \times X = 1080$<br>$e_{minus} = 2 \times |\Delta N| = 602$ | $\Delta N = \lceil \Delta N_{2nd}/2 \rceil = -302$<br>$X = N^{TTI}/3 + \Delta N^2_{1st} = 539$<br>$e_{ini} = X = 539$<br>$e_{plus} = X = 539$<br>$e_{minus} = |\Delta N| = 302$ | |
| 2 | $\Delta N = y = -603$<br>$X = N^{TTI}/3 = 1444$<br>$e_{int} = X = 1444$<br>$e_{plus} = X = 1444$<br>$e_{minus} = |\Delta N| = 841$ | No puncture | $\Delta N = 0$: No puncture | $x = N^{TTI}/3 = 1444$<br>$Y = \Delta N_{2nd} = -603$<br>$z = x + y = 841$ |
| 3 | $\Delta N = z = -63$<br>$X = N^{TTI}/3 = 1444$<br>$e_{int} = X = 1444$<br>$e_{plus} = 2 \times X = 2888$<br>$e_{minus} = 2 \times |\Delta N| = 126$ | $\Delta N = -x = -540$<br>$X = N^{TTI}/3 + \Delta N^1_{1st} = 540$<br>$e_{int} = X = 540$<br>$e_{plus} = X = 540$<br>$e_{minus} = |\Delta N| = 540$ | No puncture | $x = N^{TTI}/3 = \Delta N^1_{1st} = 540$<br>$y = \Delta N_{2nd} = -603$<br>$z = x + y = -63$ | coding scheme could also include a convoluational code or another Turbo code.

Max iteration: Turbo Encoder uses an iterative decoding. In the example, the number of iteration is 8. There is not much performance gain from 8 iterations to more than 8.

Metric/Max-log MAP: The identification used for a simple Turbo decoding algorithm.

Packet error rate (PER) properties were taken concerning some IR buffer size. In order to see the effect of different IR buffer size, the increase in IR buffer size is defined as:

$$\frac{a-b}{c-b} \times 100$$

where
- a: the total number of Turbo encoded bits;
- b: the number of physical channel bits; and
- c: IR buffer size.

In the graphs of FIGS. 6 and 7, "0%" means the bit level Chase Combining and "100%" means applying full IR using the Turbo Decoder with R=⅓.

FIGS. 6 and 7 show the PER properties of the 16AQM with R=¾ in the case of second and third transmissions in terms of the increase of IR buffer size. As shown, the PER is improved by an increase of the IR buffer size. Table 10 shows Ior/Ioc values required to achieve 5% of PER regarding three MCS's under the AWGN environment. Totally rapid Ior/Ioc improvement may be obtained even if the increase of IR buffer size is less than 50% when higher MCS level is selected.

TABLE 10

|  |  | 0% | 25% | 50% | 75% | 100% |
|---|---|---|---|---|---|---|
| 2nd Tx | 16QAM, R = ½ | −6.8 | −7.3 | −7.55 | −7.75 | −8.05 |
|  | 16QAM, R = ¾ | −3.25 | −4.85 | −5.55 | −5.85 | −5.95 |
|  | 64QAM, R = ¾ | 2.05 | −0.3 | −1.4 | −1.75 | −1.95 |
| 3rd Tx | 16QAM, R = ½ | −8.15 | −8.85 | −9.15 | −9.5 | −9.8 |
|  | 16QAM, R = ¾ | −4.9 | −6.7 | −7.3 | −7.75 | −8.2 |
|  | 64QAM, R = ¾ | 0.5 | −2.35 | −3.35 | −4 | −4.6 |

Table 10 illustrates the gain due to two-stage rate matching against the Chase Combining (no incremental redundancy). 0% in Table 10 means there is no extra memory for incremental redundancy. The receiver has the soft buffer which can only store packet, so a second or third RV cannot be received. 100% means there is enough memory size which can store all the Turbo Encoded bits, therefore, nothing really occurs at the first rate matching. There are no punctured bits. Some bits will still be punctured at the second rate matching because of the restrictions on-the number of physical channel bits.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed:

1. A method of processing a data stream for high speed wireless transmission between a transmitting unit and a receiving unit comprising the steps of:
   providing a data stream comprised of information bits and cyclic redundancy check (CRC) bits;
   encoding said data stream to generate first, second and third bit groupings comprised of first parity bits, second parity bits and systematic bits respectively;
   determining the number of bit storage locations available at said receiving unit;
   first rate matching said first, second and third bit groupings according to a selected pattern to provide modified first, second and third bit groupings such that the total number of bits in said modified first, second and third bit groupings is equal to said number of bit storage locations available at said unit;
   determining the number of transmission bits, said number of transmission bits equal to the total number of bits that can be transmitted during a single transmission frame of a transport channel;
   second rate matching said modified first, second and third bit groupings according to a selected set of parameters to identify first parity bits, second parity bits and systematic bits for generating a transmission stream comprised of selected ones of said identified bits having a total number of bits equal to said number of transmission bits.

2. A method of processing a data stream for high speed wireless transmission between a transmitting unit and a receiving unit comprising the steps of:
   providing a data stream comprised of information bits and cyclic redundancy check (CRC) bits;
   encoding said data stream to generate first, second and third bit groupings comprised of first parity bits, second parity bits and systematic bits respectively;
   determining the number of bit storage locations available at said receiving unit;
   first rate matching said first, second and third bit groupings according to a selected pattern to provide modified first, second and third bit groupings such that the total number of bits in said modified first, second and third bit groupings is equal to said number of bit storage locations available at said unit;
   determining the number of transmission bits, said number of transmission bits equal to the total number of bits that can be transmitted during a single transmission frame of a transport channel;
   second rate matching said modified first, second and third bit groupings according to a selected set of parameters to identify first parity bits, second parity bits and systematic bits for generating a transmission stream comprised of selected ones of said identified bits having a total number of bits equal to said number of transmission bits;
   receiving said transmission stream;
   de-rate matching said received transmission stream according to a first set of said selected parameters to generate recovered modified first, second and third bit groupings;
   storing said recovered modified first, second and third bit groupings;
   de-rate matching said recovered, modified first, second and third bit groupings as determined by said selected pattern and generating a recovered encoded data stream;

decoding said recovered encoded data stream to provided a decoded data stream;

running a cyclic redundancy check (CRC) on said decoded data stream and determining if said cyclic redundancy check passes or fails.

3. The method of claim 2 further comprising the steps of transmitting a first or ACK signal to said transmitting unit if said decoded data stream passes said cyclic redundancy check.

4. The method of claim 2 further comprising the steps of:
transmitting a second or NACK signal to said transmitting unit if said decoded data stream fails said cyclic redundancy check;
repeating said step of said second rate matching through said step of running a cyclic redundancy check, wherein said selected set of parameters is changed; and
transmitting a first or ACK signal to said transmitting unit if said decoded data stream passes said cyclic redundancy check.

5. The method of claim 4 wherein said steps of storing said recovered modified first, second and third bit groupings further comprises combining bits of said first, second and third bit groupings that are common to primarily stored and recovered bits and storing the resultant value.

6. The method of claim 5 wherein said step of combining bits comprises the step of soft-combining said bits.

7. The method of claim 4 wherein said number of bits that can be transmitted during a single transmission cycle is less than the sum of the bits in the modified first, second and third bit groupings and wherein said selected set of parameters controls said second rate matching such that during a first transmission no systematic bits are punctured, and said first parity bits and said second parity bits are punctured substantially equally; and
wherein said changed selected set of parameters controls said rate matching such that during a subsequent transmission none of the first parity bits are punctured, the systematic bits are punctured and the second parity bits are punctured if necessary.

8. The method of claim 2 further comprising the steps of:
transmitting a second or NACK signal to said transmitting unit if said decoded data stream fails said cyclic redundancy check; and
repeating said step of said second rate matching through said step of running a cyclic redundancy check, wherein said selected set of parameters is changed; and
transmitting another second or NACK signal to said transmitting unit if said data stream decoded during said repeated step fails said cyclic redundancy check;
again repeating said step of said second rate matching through said step of running a cyclic redundancy check wherein said selected set of parameter is again changed; and
transmitting a first or ACK signal to said transmitting unit if said data decoded during said again repeated steps passes said redundancy check.

9. The method of claim 8 wherein said steps of storing said recovered modified first, second and third bit groupings further comprises combining bits of said first, second and third bit groupings that are common to primarily stored and recovered bits and storing the resultant value.

10. The method of claim 9 wherein said step of combining bits comprises the step of soft-combining said bits.

11. The method of claim 8 wherein said number of bits that can be transmitted during a single transmission cycle is less than the sum of the bits in the modified first, second and third bit groupings and wherein said selected set of parameters controls said second rate matching during a first transmission such that no systematic bits are punctured, and said first parity bits and said second parity bits are punctured substantially equally; and
wherein said changed selected set of parameters controls said rate matching such that during a second transmission none of the first parity bits are punctured, the systematic bits are punctured and the second parity bits are punctured if necessary; and
wherein said again changed selected set of parameters controls said rate matching such that during a third transmission none of the second parity bits are punctured, the first parity bits are punctured first and the systematic bits are punctured if necessary.

12. The method of claim 2 wherein said number of bits that can be transmitted during a single transmission cycle is less than the sum of the bits in the modified first, second and third bit groupings and wherein said selected set of parameters controls said second rate matching such that no systematic bits are punctured, and said first parity bits and said second parity bits are punctured substantially equally.

13. The method of claim 2 wherein said number of bits that can be transmitted during a single transmission cycle is greater than the sum of the bits in the modified first, second and third bit groupings and wherein said selected set of parameters controls said second rate matching so that bits are added such that the sum of the modified first, second and third bit groupings plus the added bits is equal to the number of transmission bits.

14. A method of processing a data stream for high speed wireless transmission between a transmitting unit and a receiving unit comprising the steps of:
providing a data stream comprised of information bits and cyclic redundancy check (CRC) bits:
turbo encoding said data stream to generate first, second and third bit groupings comprised of first parity bits, second parity bits and systematic bits respectively;
determining the number of bit storage locations available at said receiving unit;
first rate matching said first, second and third bit groupings according to a selected pattern to provide modified first, second and third bit groupings such that the total number of bits in said modified first, second and third bit groupings is equal to said number of bit storage locations available at said unit;
determining the number of transmission bits, said number of transmission bits equal to the total number of bits that can be transmitted during a single transmission frame of a transport channel;
second rate matching said modified first, second and third bit groupings according to a selected set of parameters to identify first parity bits, second parity bits and systematic bits for generating a transmission stream comprised of selected ones of said identified bits having a total number of bits equal to said number of transmission bits.

15. A method of processing a data stream for high speed wireless transmission between a transmitting unit and a receiving unit comprising the steps of:
providing a data stream comprised of information bits and cyclic redundancy check (CRC) bits;
encoding said data stream to generate first, second and third bit groupings comprised of first parity bits, second parity bits and systematic bits respectively;
determining the number of bit storage locations available at said receiving unit;

first rate matching said first, second and third bit groupings according to a selected pattern to provide modified first, second and third bit groupings such that the total number of bits in said modified first, second and third bit groupings is equal to said number of bit storage locations available at said unit;

determining the number of transmission bits, said number of transmission bits equal to the total number of bits that can be transmitted during a single transmission frame of a transport channel;

second rate matching said modified first, second and third bit groupings according to a selected set of parameters to identify first Parity bits, second Parity bits and systematic bits for generating a transmission stream comprised of selected ones of said identified bits having a total number of bits equal to said number of transmission bits; and wherein said number of first storage locations available at said receiving unit is less than the sum of the bits in the first, second and third bit groupings and said step of first rate matching comprises puncturing selected bits in said first, second and third bit groupings.

16. A method of processing a data stream for high speed wireless transmission between a transmitting unit and a receiving unit comprising the steps of:

providing a data stream comprised of information bits and cyclic redundancy check (CRC) bits;

encoding said data stream to generate first, second and third bit groupings comprised of first parity bits, second parity bits and systematic bits respectively;

determining the number of bit storage locations available at said receiving unit;

first rate matching said first, second and third bit groupings according to a selected pattern to provide modified first, second and third bit groupings such that the total number of bits in said modified first, second and third bit groupings is equal to said number of bit storage locations available at said unit;

determining the number of transmission bits, said number of transmission bits equal to the total number of bits that can be transmitted during a single transmission frame of a transport channel;

second rate matching said modified first, second and third bit groupings according to a selected set of parameters to identify first parity bits, second parity bits and systematic bits for generating a transmission stream comprised of selected ones of said identified bits having a total number of bits equal to said number of transmission bits; and wherein said number of first storage locations available at said receiving unit is greater than the sum of the bits in the first, second and third bit groupings and said step of first rate matching comprises repeating selected bits in said first, second and third bit groupings.

17. A method of processing a data stream for high speed wireless transmission between a transmitting unit and a receiving unit comprising the steps of:

providing a data stream comprised of information bits and cyclic redundancy check (CRC) bits;

encoding said data stream to generate first, second and third bit groupings comprising first, second and third separate bit streams comprised of first parity bits, second parity bits and systematic bits respectively;

determining the number of bit storage locations available at said receiving unit;

first rate matching said first, second and third bit groupings according to a selected pattern to provide modified first, second and third bit groupings such that the total number of bits in said modified first, second and third bit groupings is equal to said number of bit storage locations available at said unit;

determining the number of transmission bits, said number of transmission bits equal to the total number of bits that can be transmitted during a single transmission frame of a transport channel;

second rate matching said modified first, second and third bit groupings according to a selected set of parameters to identify first parity bits, second panty bits and systematic bits for generating a transmission stream comprised of selected ones of said identified bits having a total number of bits equal to said number of transmission bits.

* * * * *